US008376203B2

(12) United States Patent
Martel et al.

(10) Patent No.: US 8,376,203 B2

(45) Date of Patent: Feb. 19, 2013

(54) APPARATUS AND METHOD FOR RAPID INSTALLATION OF HIDDEN DECK PLANK FASTENERS

(75) Inventors: David Martel, Harwinton, CT (US); Johnathan Gardner, West Hartford, CT (US)

(73) Assignee: OMG, Inc., Agawam, MA (US)

( * ) Notice: Subject to any disclaimer, the term of this patent is extended or adjusted under 35 U.S.C. 154(b) by 491 days.

(21) Appl. No.: 12/573,540

(22) Filed: Oct. 5, 2009

(65) Prior Publication Data

US 2010/0181362 A1 Jul. 22, 2010

Related U.S. Application Data

(60) Provisional application No. 61/145,185, filed on Jan. 16, 2009.

(51) Int. Cl.
*B23Q 7/10* (2006.01)

(52) U.S. Cl. .......... 227/15; 227/119; 227/140; 227/148; 227/156; 29/428

(58) Field of Classification Search .................... 227/15, 227/18, 119, 120, 148, 140, 151, 156, 136; 29/428, 787, 525.01
See application file for complete search history.

(56) References Cited

U.S. PATENT DOCUMENTS

| | | | | |
|---|---|---|---|---|
| 2,946,060 | A * | 7/1960 | Powers | 227/120 |
| 3,633,810 | A * | 1/1972 | Krakauer et al. | 227/20 |
| 4,339,065 | A * | 7/1982 | Haytayan | 227/8 |
| 4,485,952 | A * | 12/1984 | Weis | 227/7 |
| 4,509,668 | A | 4/1985 | Klaus et al. | |
| 4,809,568 | A * | 3/1989 | DeCaro | 81/57.37 |
| 5,042,142 | A * | 8/1991 | Beach et al. | 29/787 |
| 5,378,102 | A * | 1/1995 | Mossman | 411/531 |
| 6,273,316 | B1 * | 8/2001 | Losada | 227/119 |
| 6,598,775 | B1 * | 7/2003 | Chen | 227/113 |
| 6,711,809 | B1 * | 3/2004 | Fischer et al. | 29/813 |
| 6,761,299 | B2 * | 7/2004 | Caringella et al. | 227/10 |
| 6,779,697 | B2 * | 8/2004 | Lin | 227/120 |
| 6,932,261 | B2 * | 8/2005 | Huang | 227/120 |
| 7,287,681 | B1 * | 10/2007 | Wen | 227/120 |
| 7,739,807 | B2 * | 6/2010 | Grant | 33/645 |
| 7,882,994 | B2 * | 2/2011 | Francescon | 227/148 |

* cited by examiner

*Primary Examiner* — Scott A. Smith
(74) *Attorney, Agent, or Firm* — Alix, Yale & Ristas, LLP

(57) ABSTRACT

An apparatus for installing a hidden fastener in the course of attaching a plank to a joist includes a power tool with a retainer for holding the hidden fastener. The hidden fastener is placed on the retainer so that an attachment opening formed through the hidden fastener is in registration with a bore formed in the retainer for receiving a securing member. The power tool is used to position the hidden fastener in engagement with the plank, and to drive a securing member from the bore of the retainer through the attachment opening of the hidden fastener.

19 Claims, 6 Drawing Sheets

APPARATUS AND METHOD FOR RAPID INSTALLATION OF HIDDEN DECK PLANK FASTENERS

CROSS REFERENCE TO RELATED APPLICATIONS

The present application claims priority to U.S. Provisional Patent Application Ser. No. 61/145,185, "PNEUMATIC GUN ADAPTER FOR HIDDEN DECK PLANK FASTENERS", filed Jan. 16, 2009, and hereby incorporates herein by reference the disclosures thereof. The present application also hereby incorporates herein by reference the relevant disclosures of co-pending and commonly owned U.S. patent application Ser. No. 11/717,395, "FASTENER FOR GROOVED OR SLOTTED DECKING MEMBERS", filed Mar. 13, 2007.

FIELD OF THE INVENTION

The present invention relates to construction tools and, more particularly, to an apparatus and a method for installing hidden fasteners to attach deck planks or the like to joists or other supports.

BACKGROUND OF THE INVENTION

Referring to FIG. 1, a first deck plank 10 can be attached to an underlying joist 12 or other support member using a hidden fastener 14, as disclosed in U.S. patent application Ser. No. 11/717,395 by Martel. In the past, as shown in FIG. 2, the hidden fastener 14 was manually positioned with a forwardly projecting wing 16 of the fastener engaging a lateral groove 18 formed along the plank 10 at one edge and with an attachment opening 20, formed in a main body 22 of the fastener, overlying the joist 12. With one hand, a worker would hold the fastener in position against the plank and the joist, while with the other hand, the worker would drive a screw or a similar securing member 24 into the joist through the attachment opening 20. A series of the fasteners engaging the lateral groove 18 would secure the one edge of the plank to the underlying joist. A worker then would install a second grooved plank in the same manner adjacent the first plank, with a lateral groove of the second plank fitted over the rearwardly projecting wings 26 of the fasteners of the first plank, so that the secured fasteners would be hidden between the adjacent planks.

Positioning the hidden fasteners by hand and driving the securing members into the joists is a labor-intensive process that becomes both tedious and costly when several hundred fasteners need to be installed. For example, more than eight hundred (800) fasteners are needed for a thirty (30) foot by fifteen (15) foot deck. As shown in FIG. 2, a power tool can be used for driving the securing members. However, manual positioning of the fasteners still requires significant time and also requires the worker to hold the fasteners with his hand near the working end of the power tool as the securing members are driven into the joists. Accordingly, it is desirable to provide an apparatus and a method for installation of hidden fasteners in rapid fashion and without positioning the fasteners by hand near the working end of a power tool.

SUMMARY OF THE INVENTION

According to one embodiment of the present invention, a retainer is provided for installing a fastener in the course of attaching a plank to an underlying support member. The retainer includes a barrel defining a bore that extends through forward and rearward ends of the barrel for receiving a securing member, and a head protruding from the forward end of the barrel. The head is shaped and positioned for holding a fastener with an attachment opening of the fastener in registration with the bore.

The retainer also can be connected to a power tool, such as an air-operated nailer. The power tool can be used to position a fastener and to drive a securing member through the fastener into an underlying support.

According to another embodiment of the present invention, an apparatus is provided for installing a fastener with at least one projecting wing and an attachment opening in the course of attaching a plank to an underlying support member. The apparatus includes a retainer for holding the fastener and a driving tool connected with the retainer for driving a securing member through the attachment opening of the fastener into a support. The retainer includes a barrel and a head formed at the forward end of the barrel. The barrel defines a bore for receiving a securing member, and the head has a datum surface disposed in a predetermined position relative to the bore such that with a predetermined portion of a fastener resting against the datum surface, an attachment opening of the fastener is held in registration with the bore. The driving tool can be used to position the fastener and then actuated to drive a securing member from the bore of the retainer through the attachment opening of the fastener into a support.

According to a further aspect of the present invention, a method is provided for attaching a plank to a joist or other support using a power tool with a retainer for holding a fastener. A fastener is loaded onto the retainer, and the power tool is positioned so that the fastener engages the plank, and an attachment opening of the fastener overlies the joist. The power tool is actuated to drive a securing member through the attachment opening of the fastener and into the support.

These and other objects, features and advantages of the present invention will become apparent in light of the detailed description of the best mode embodiment thereof, as illustrated in the accompanying drawings.

DESCRIPTION OF PREFERRED EMBODIMENTS

Figure 3:
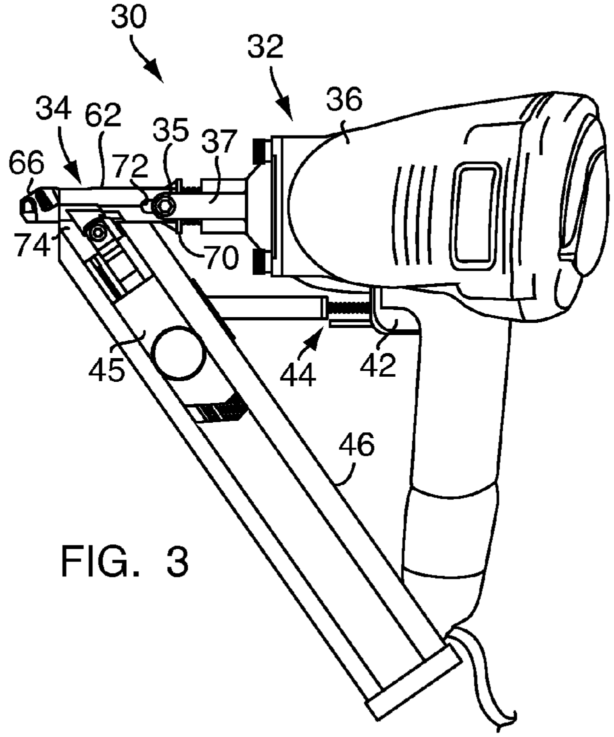
FIG. 3 is a left side view of an apparatus for installing hidden fasteners, according to one embodiment of the present invention.

Referring to FIG. 3, according to one embodiment of the present invention, an apparatus 30 for installing a hidden fastener includes a conventional air-nailer 32, or a similar power tool, and a retainer 34 captured in the air-nailer by screws 35. As better shown in FIG. 4, the air-nailer includes a body 36 which includes a driver port 38, a hammer 40 housed for reciprocating motion within the driver port, a trigger 42 for actuating the hammer, and a push safety mechanism 44 for selectively interrupting operation of the trigger substantially as shown and described in U.S. Pat. No. 4,509,668 to Klaus and Wilhelm, relevant disclosures thereof being hereby incorporated herein by reference. The retainer 34 is operatively connected to the push safety mechanism 44 by a conventional slide-and-spring magazine 46, which also holds a "stick" 48 of securing members 24. In operation a spring-loaded slide 45 pushes the stick of securing members through the magazine toward the retainer. For operation of the safety mechanism, the rearward end of a barrel 62 forming part of the retainer 34 is slidably movable into and out of the driver port 38. The retainer is held in the driver port by the screws 35 at the ends of arms 37 protruding from the body 36, and is urged outwardly from the body by a compression spring 39 extending between the driver port 38 and a flange 70 formed on the retainer.

Figure 1:
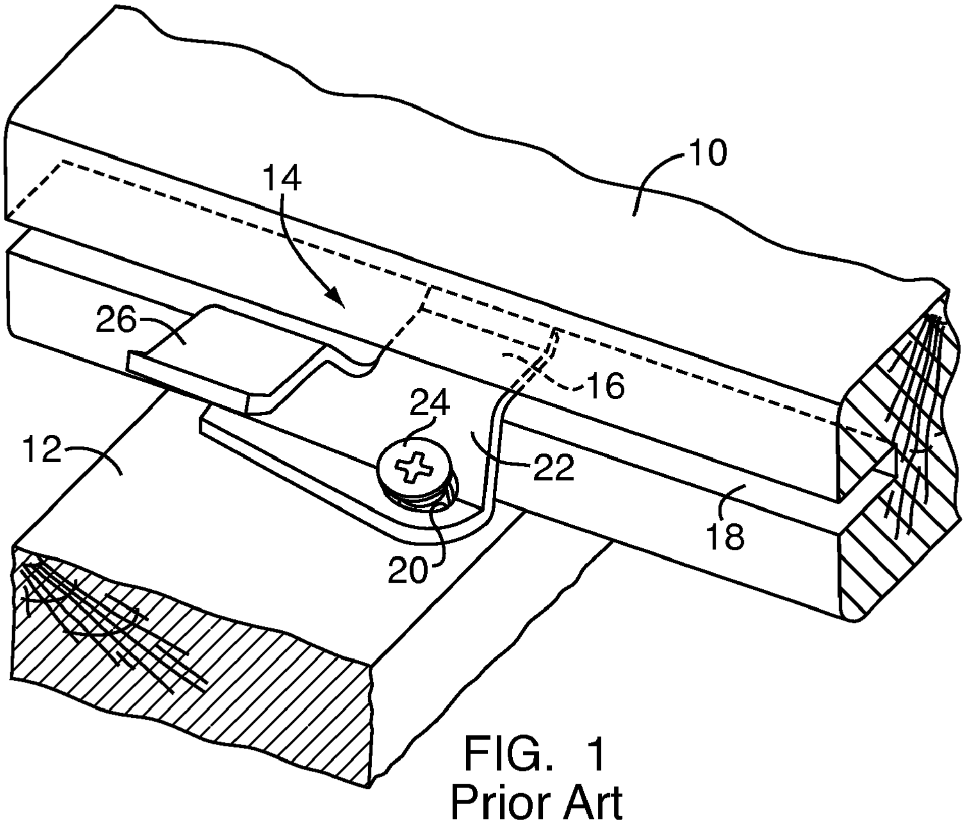
FIG. 1 Prior Art
FIG. 1 is a perspective view of a hidden fastener in use for attaching a grooved plank to an underlying joist, according to the prior art.
Figure 2:
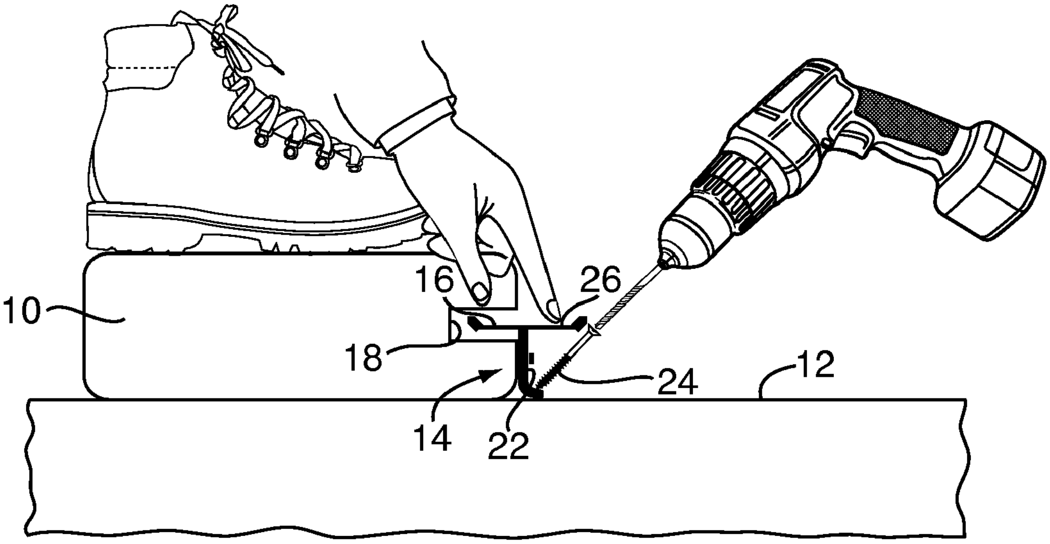
FIG. 2 Prior Art
FIG. 2 is a schematic illustration of a method for installing the hidden fastener shown in FIG. 1, according to the prior art.
Figure 4:
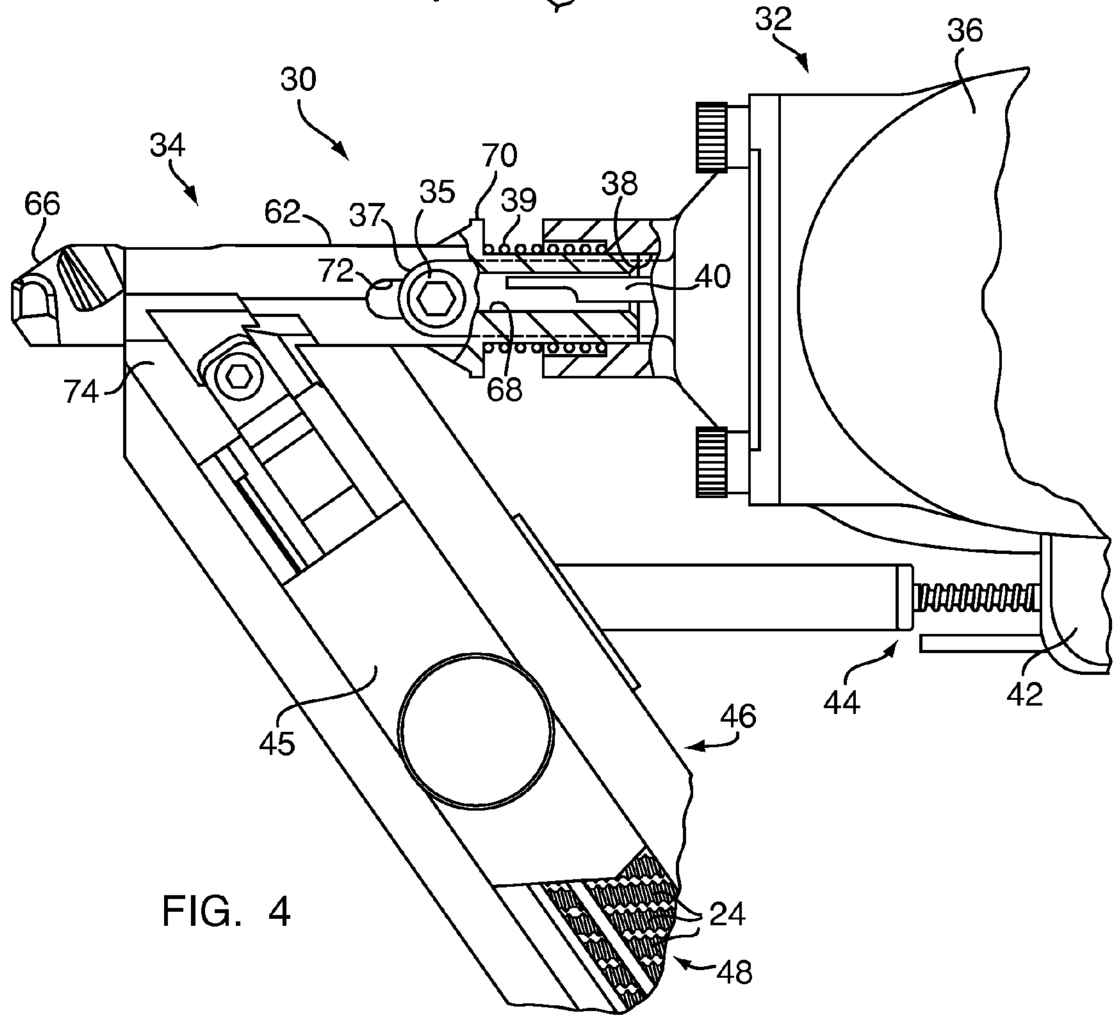
FIG. 4 is a detail partially sectioned side view of the apparatus shown in FIG. 3.
Figure 5:
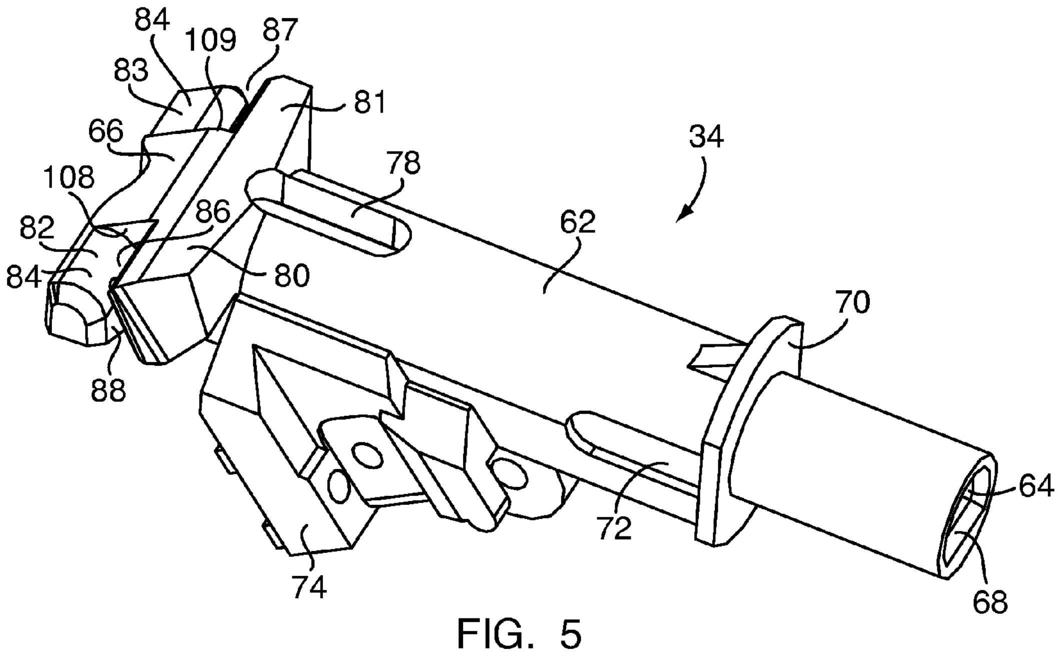
FIG. 5 is a perspective view of a retainer of the apparatus shown in FIG. 3.
Figure 6:
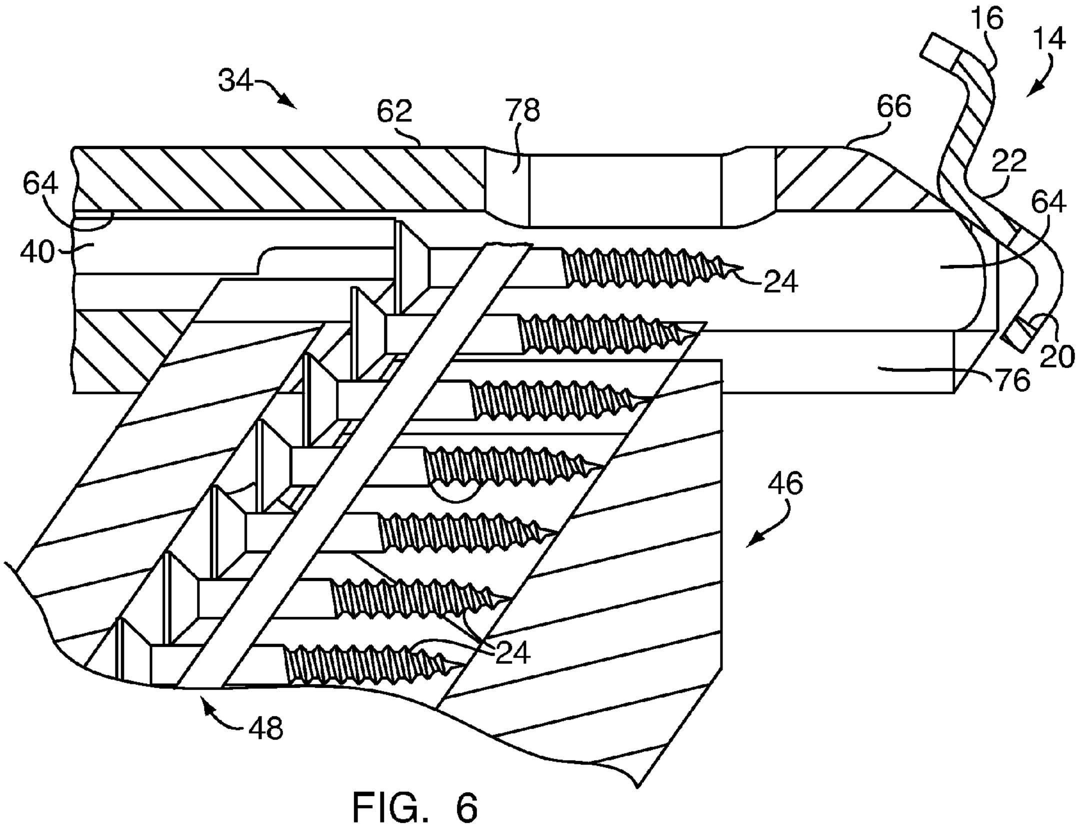
FIG. 6 is a partially sectioned side view of the retainer and fastener, taken through a central plane 6-6 in FIG. 9.
Figure 7:
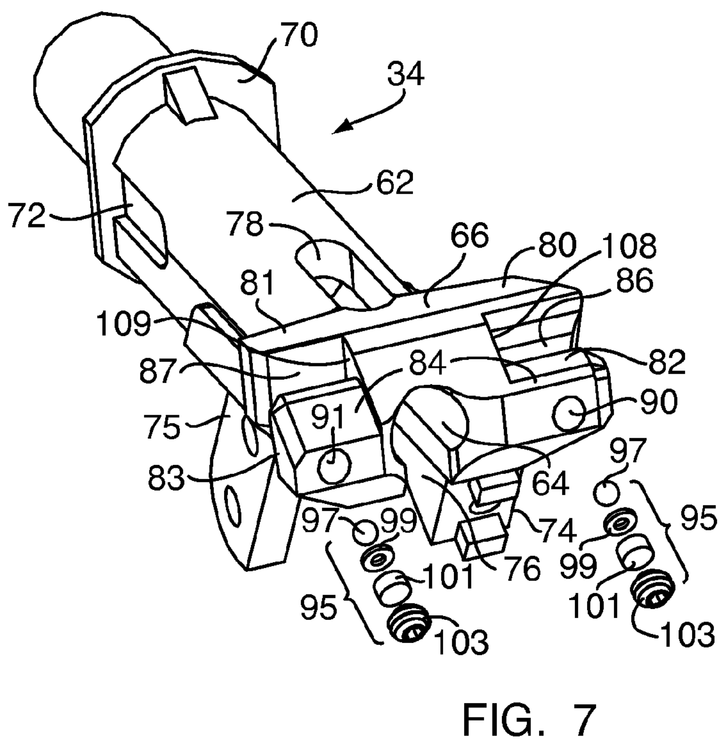
FIG. 7 is a frontal perspective view of the retainer shown in FIG. 5.

Referring to FIGS. 5 and 7, the retainer 34 includes the barrel 62 that defines a bore 64, and a head 66 formed at a forward end of the retainer. The bore is adapted to hold a securing member to be driven by the air-nailer, and has an inlet 68 for receiving the hammer 40 (FIG. 4) of the air-nailer to drive the securing member through the bore. The head is adapted to hold a hidden fastener with an attachment opening 20 (shown in FIG. 1) in alignment with the bore such that the air-nailer can drive a securing member through the attachment opening (see FIG. 6).

Still referring to FIGS. 5 and 7, the retainer 34 includes the flange 70 protruding outward from the barrel near the rearward end and pockets 72 formed along lateral sides of the barrel just forward of the flange. The part of the barrel rearward from the flange slides within the driver port 38 of the air-nailer 32, as mentioned above. The flange 70 and the pockets 72 are engaged by the screws 35 for capturing the retainer 34 in the air-nailer 32, as described in connection with FIG. 4. The retainer 34 further includes a left leg 74 and a right leg 75 extending downward from the lateral sides of the barrel 62 just rearward of the head 66. The left leg 74 and the right leg 75 have various protrusions, holes, and other features for connecting the magazine 46 of the air-nailer to the retainer, as also shown in FIG. 4, so that securing members 24 can be loaded from the magazine into the bore, as also shown in FIG. 6. The left and right legs can be symmetrical, or can have individual features complementary to the magazine. It will be understood that other connectors can be formed on or attached to the retainer for use with various conventional power tools, magazines, and safety mechanisms.

Referring to FIG. 6, the barrel 62 has a loading slot 76 in the lower side of the barrel for loading securing members 24 one-by-one from the slide-and-spring magazine 46 into the bore 64. The barrel also has a viewing window 78 cut radially into an upper side of the bore for verifying that a securing member has been loaded into the bore.

Referring to FIGS. 5 and 7 again, the head 66 protrudes from the forward end of the barrel 62 adjacent to the forward end of the bore 64. Although the head is shown as substantially U-shaped for straddling the bore, the head also could form a donut shape for the same reason. The head includes left and right shoulders 80, 81 extending laterally outward from the forward end of the barrel 62, a left horn 82 that protrudes laterally outward from the head forward of and parallel to the left shoulder 80, and a right horn 83 that protrudes laterally outward from the head forward of and parallel to the right shoulder 81. The left and right horns have substantially coplanar forward faces that together define a working face or nose 84 of the head 66. Between the left horn and the left shoulder, a left notch 86 extends into the head to a left datum surface 108. Between the right horn and the right shoulder, a right notch 87 extends into the head to a right datum surface 109. The shoulders and horns are dimensioned so that each notch can hold a hidden fastener by one wing, with the attachment opening 20 in registration with the bore 64, while the other wing projects forwardly from the retainer.

Figure 8:
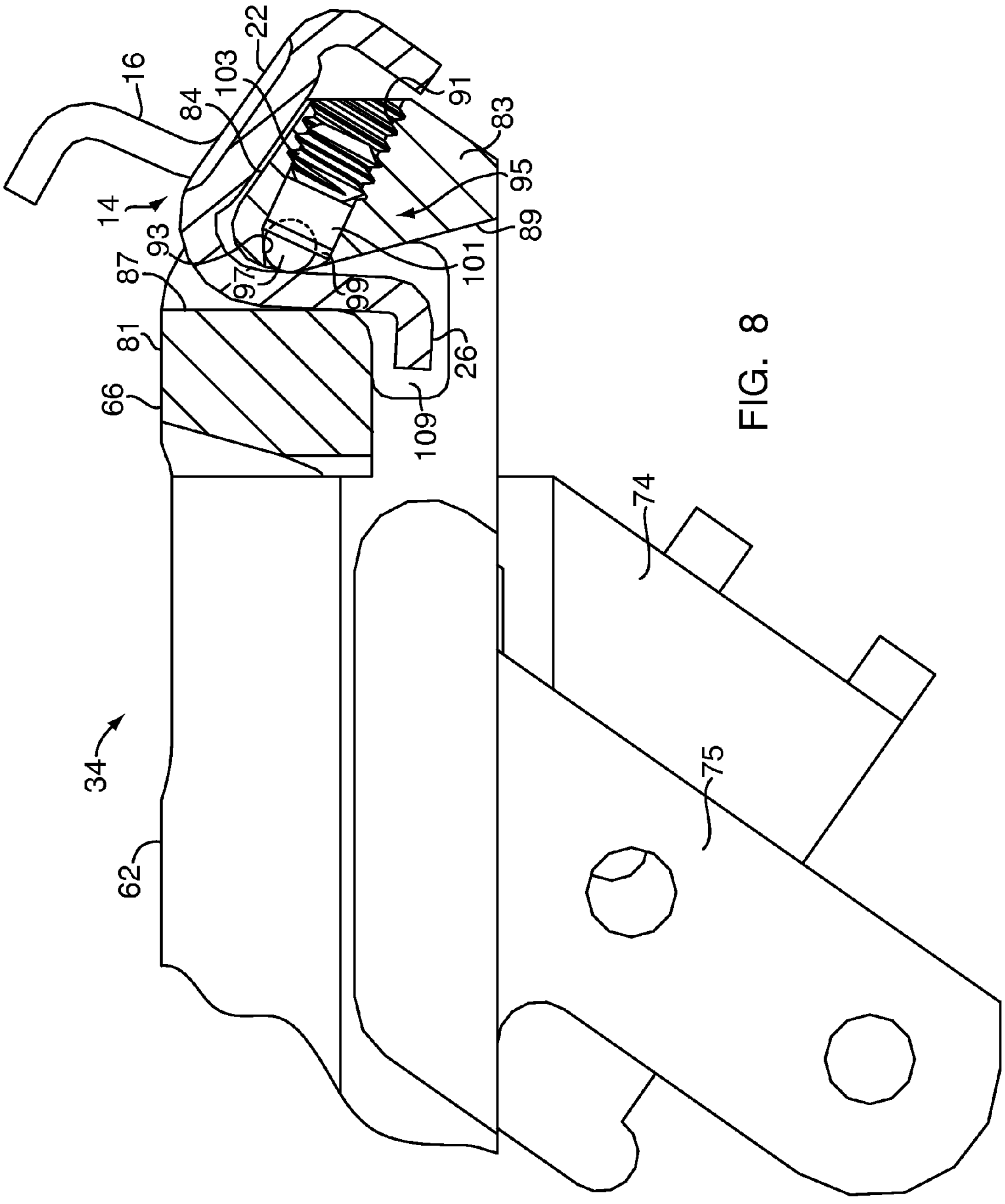
FIG. 8 is a partially sectioned side view of the retainer, taken through a plane 8-8 in FIG. 9.

Referring to FIG. 8, a rearward surface 89 of the right horn 83 is inclined relative to the length of the barrel 62. By contrast, a rearward surface 88 of the left horn 82 is substantially vertical, in a plane perpendicular to the axis of the barrel. Thus, the left notch 86 and the right notch 87 are angled with reference to each other for accommodating different varieties of hidden fasteners. The notches also are angled with reference to the barrel so that a forwardly projecting wing of a hidden fastener held in either of the notches can easily be inserted into a groove of a plank without having to force the retainer against the plank.

The right horn 83 includes an internally-threaded detent passage 91 extending into the nose 84 toward and through the rearward surface 89 of the right horn. The detent passage is substantially cylindrical, but narrows to a conical seat 93 adjacent to the right notch 87. The detent passage houses a detent assembly 95, which includes a ball 97, a resilient washer 99, a plug 101, and a set screw 103. The detent assembly 95 is shown in exploded form in FIG. 7. The ball 97 protrudes partially into the right notch, but is retained in the detent passage by the conical seat. The resilient washer 99 is pressed against the noseward side of the ball. The plug 101 is pressed against the noseward side of the resilient washer. The set screw 103 is threaded into the detent passage to retain and compress the ball, the washer, and the plug. The resilient washer and the plug provide sufficient compressive play so that the ball can be depressed into the detent passage by insertion of the rear wing 26 of the hidden fastener 14 into the right notch 87. Pressure of the ball then holds the hidden fastener in the right notch. The left horn 82 includes a similar detent passage 90 and an identical detent assembly 95.

Figure 9:
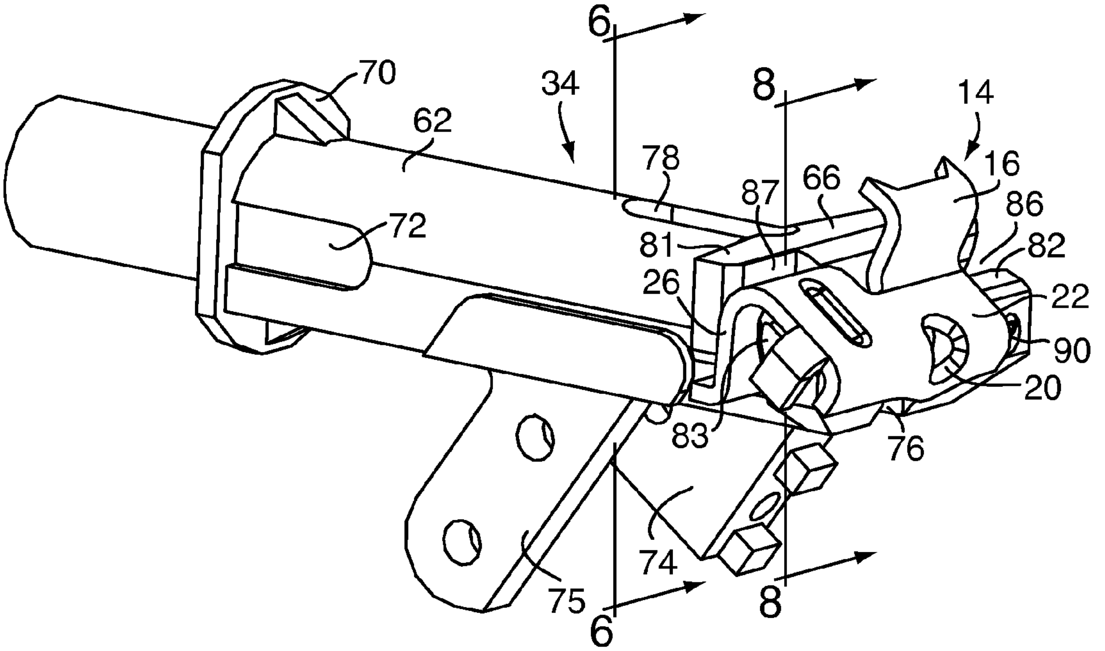
FIG. 9 is a front perspective view of a hidden fastener loaded onto the retainer shown in FIGS. 5 and 7.

In operation, as shown in FIGS. 8 and 9, a hidden fastener such as the hidden fastener 14 is manually inserted into either the notch 86 between the left shoulder 80 and the left horn 82, or the notch 87 between the right shoulder 81 and the right horn 83, so that the rear wing 26 of the hidden fastener is clipped between the horn and the shoulder by pressure of one of the detent balls 97. The hidden fastener slides laterally onto the horn until an inner edge of the rear wing is positioned against the left datum surface 108 or the right datum surface 109, and so that the attachment opening 20 formed through the hidden fastener is aligned in registration with the bore 64 of the retainer 34 as shown in FIG. 6. By looking through the viewing window 78, the user can determine whether a nail, a ballistic screw, or an equivalent securing member 24 has been loaded into the bore 64 in alignment with the opening 20.

Figure 10A:
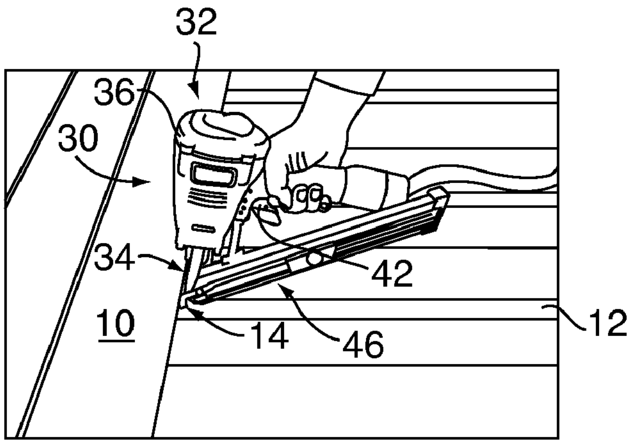
FIGS. 10A-10C are perspective views illustrating sequential steps of a method for rapidly installing hidden fasteners, according to one embodiment of the present invention.
Figure 10B:
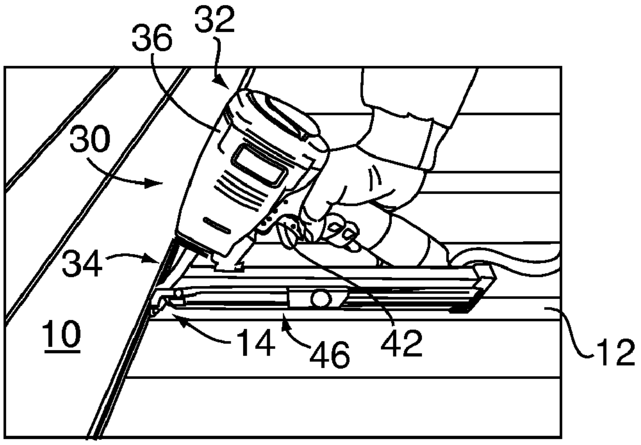
Figure 10C:
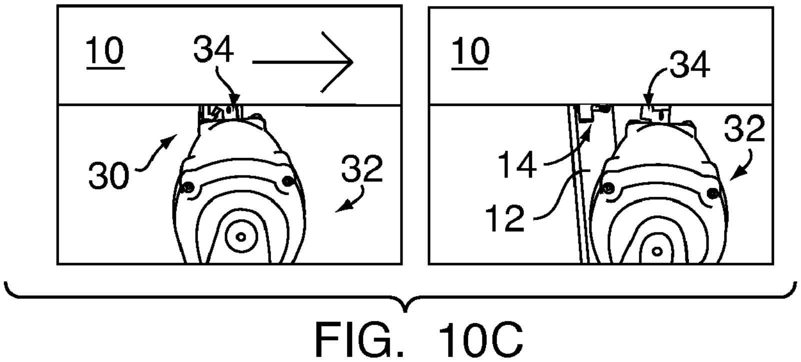

Referring to FIGS. 10A-10C, with the hidden fastener 14 held on the head 66 of the retainer 34, and with a securing member 24 loaded into the bore 64, the operator uses the air-nailer 32 to position the hidden fastener at an inside corner formed by the plank 10 and the joist 12. The air nailer may be held at an elevated angle to the joist for insertion of the front wing 16 of the hidden fastener into the lateral groove 18 of the plank, and then is lowered to seat the front wing into the lateral groove 18, as better shown in FIG. 1. Then the operator actuates the air-nailer to drive the securing member from the bore of the barrel through the opening of the hidden fastener (FIG. 10B). After the securing member has been driven, the operator twists or slides the pneumatic tool to disengage the head 66 from the hidden fastener 14 (FIG. 10C). Another hidden fastener now can be clipped onto the head 66, while another securing member is loaded into the bore 64. An array of hidden fasteners can be installed along the plank, and then a subsequent plank can be installed with one of its grooves engaging the rear wings 26 of the array of hidden fasteners.

One advantage of the present invention is that the retainer easily receives a hidden fastener, thereby permitting rapid manual loading of the hidden fastener onto the tool. Another advantage of the present invention is that the retainer securely holds the hidden fastener, enabling use of the pneumatic tool to place the hidden fastener in position for installation adjacent to a grooved board and a joist. Yet another advantage of the present invention is that the retainer holds the hidden fastener with an attachment opening of the hidden fastener aligned to a bore formed through the retainer, thereby enabling the hidden fastener to be fastened to the joist using only one hand. Additionally, the retainer easily releases the hidden fastener after the hidden fastener has been fastened to the joist, thereby permitting rapid installation of a plurality of hidden fasteners. Yet a further advantage is that by enabling one-handed positioning and securing of the hidden fastener, the combination of the retainer with the pneumatic tool permits use of a second hand to support the grooved plank, thereby enhancing use of the hidden fastener for attaching grooved planks to vertical framing members.

Since certain changes may be made in the above-described pneumatic tool for installation of hidden deck fasteners, without departing from the spirit and scope of the invention herein involved, it is intended that all of the subject matter disclosed in the above description and in the accompanying drawings shall be interpreted merely as examples illustrating the inventive concept herein and shall not be construed as limiting the invention. For example, while the invention is described with reference to a pneumatic driving tool such as an air-nailer, other power tools such as a cordless (combustion-powered) driver, an electromagnetic nailer, or a nail gun also could be used in combination with some variants of the disclosed retainer. Also, while the described embodiment makes use of a linear spring magazine for auto loading securing members into the retainer along a line lateral to the axis of the bore, securing members equally could be loaded into the retainer along the axis of the bore, either manually or from a slide or rotary autoloader. Additionally, while in the disclosed embodiment a hidden fastener is slid laterally onto the head, in other embodiments a hidden fastener may be inserted axially into a notch formed across a forward end of the retainer adjacent to an opening of the bore. Further, while in the disclosed embodiment a detent assembly is provided for holding the hidden fastener securely in the notch indented into the head, in other embodiments all or a portion of the head of the retainer could be magnetized to hold the hidden fastener, or a hidden fastener having protrusions or indentations could be snapped into or onto complementary indentations or protrusions formed on the head. These and other variations will be apparent to those of ordinary skill in light of the present disclosure.

What is claimed is:

1. A retainer for installing a fastener in the course of attaching a plank to an underlying support, the retainer comprising:

a barrel defining a bore that extends through forward and rearward ends of the barrel for receiving a securing member; and a head protruding from the forward end of the barrel, the head having a horn spaced forward from a shoulder, the horn and shoulder extending generally laterally from the barrel and defining a notch therebetween shaped and positioned such that positioning a wing of a fastener in the notch engages the fastener with the head in a position with an attachment opening of the fastener in registration with the bore and the horn defines a working face that cooperates with the notch to leverage the engaged fastener about a lateral axis.

2. The retainer according to claim 1, further comprising:

a connector allowing the retainer to be releasably attached with a power tool.

3. The retainer according to claim 2, wherein the connector includes a flange formed around the barrel and a pocket formed along a lateral side of the barrel adjacent to the flange.

4. The retainer according to claim 1, wherein the barrel has a loading slot extending into the bore for loading a securing member into the bore.

5. The retainer according to claim 4, further comprising:

a leg extending from the barrel adjacent to the loading slot for attaching a magazine containing securing members in alignment with the loading slot.

6. The retainer according to claim 1, wherein the notch is disposed generally transverse to the bore, such that a fastener can be slid laterally onto the head.

7. The retainer according to claim 1, wherein the head has a plurality of notches for holding any one of a variety of fasteners with an attachment opening in registration with the bore.

8. The retainer according to claim 1, wherein the head has a detent passage extending generally transverse to the notch and opening onto the notch, and a detent assembly housed in the detent passage, the detent assembly including a ball, a retaining element, and a resilient element disposed to press the ball toward the notch and clip a wing of a fastener in the notch.

9. The retainer according to claim 1, wherein the notch defines an inner datum surface disposed at a predetermined position relative to the bore to position a fastener installed on the head with an attachment opening of the fastener in registration with the bore.

10. A retainer for installing a fastener in the course of attaching a plank to an underlying support, the retainer comprising:

a barrel defining a bore that extends through forward and rearward ends of the barrel for receiving a securing member; and a head protruding from the forward end of the barrel and defining an indented notch at a predetermined position relative to the bore; and a detent passage in the head extending generally transverse to the notch and opening onto the notch, and a detent assembly housed in the detent passage, the detent assembly including a ball, a retaining element, and a resilient element disposed to press the ball toward the notch and clip a wing of a fastener in the notch; wherein positioning a wing of a fastener in the notch places an attachment opening of the fastener in registration with the bore.

11. The retainer according to claim 10, further comprising:

a connector allowing the retainer to be releasably attached with a power tool.

12. The retainer according to claim 11, wherein the connector includes a flange formed around the barrel and a pocket formed along a lateral side of the barrel adjacent to the flange.

13. The retainer according to claim 10, wherein the barrel has a loading slot extending into the bore for loading a securing member into the bore.

14. The retainer according to claim 13, further comprising:

a leg extending from the barrel adjacent to the loading slot for attaching a magazine containing securing members in alignment with the loading slot.

15. The retainer according to claim 10, wherein the notch is disposed generally transverse to the bore, such that a fastener can be slid laterally onto the head.

16. The retainer according to claim 10, wherein the head has a plurality of notches for holding any one of a variety of fasteners with an attachment opening in registration with the bore.

17. The retainer according to claim 10, wherein the head has a horn spaced forward from a shoulder, the horn and shoulder extending generally laterally from the barrel to define the notch therebetween.

18. The retainer according to claim 17, wherein the notch is shaped and positioned such that positioning a wing of a fastener in the notch engages the fastener with the head in a position with an attachment opening of the fastener in registration with the bore and the horn defines a working face that cooperates with the notch to leverage the engaged fastener about a lateral axis.

19. A method for attaching a plank to a joist or other support comprising the steps of:

(a) providing a retainer for holding a fastener, comprising i. a barrel defining a bore that extends through forward and rearward ends of the barrel for receiving a securing member;

ii. a head protruding from the forward end of the barrel, the head having a horn spaced forward from a shoulder, the horn and shoulder extending generally laterally from the barrel and defining a notch therebetween shaped and positioned for receiving a wing of a fastener;

(b) attaching the retainer to a power tool for driving a securing member;

(c) loading a fastener onto the retainer by inserting the fastener wing into the notch, thereby positioning the fastener against a working face of the horn with an attachment opening of the fastener in registration with the bore;

(d) positioning the power tool so that the fastener engages the plank, and the attachment opening overlies the joist;

(e) leveraging the fastener about a lateral axis against the plank by rotating the power tool about said axis; and (f) actuating the power tool to drive a securing member through the attachment opening of the fastener and into the joist.

* * * * *

UNITED STATES PATENT AND TRADEMARK OFFICE

CERTIFICATE OF CORRECTION

PATENT NO. : 8,376,203 B2
APPLICATION NO. : 12/573540
DATED : February 19, 2013
INVENTOR(S) : David Martel and Jonathan Gardner It is certified that error appears in the above-identified patent and that said Letters Patent is hereby corrected as shown below:

Title Page

Item [75] Second Inventor:, delete "Johnathan Gardner, West Hartford, CT (US)" and substitute --Jonathan Gardner, West Hartford, CT (US)--

Signed and Sealed this
Second Day of April, 2013

Teresa Stanek Rea
*Acting Director of the United States Patent and Trademark Office*